United States Patent [19]
Ahaus et al.

[11] 4,040,673
[45] Aug. 9, 1977

[54] FLUID PRESSURE OPERABLE BRAKE APPARATUS WITH LOAD-COMPENSATING MEANS FOR VEHICLES WITH TANDEM REAR AXLES

[75] Inventors: Gerhard Ahaus, Fellbach; Siegfried Netzer, Waiblingen; Hans-Peter Liebig, Esslingen, all of Germany

[73] Assignee: WABCO Westinghouse GmbH, Hannover, Germany

[21] Appl. No.: 734,391

[22] Filed: Oct. 21, 1976

[30] Foreign Application Priority Data

Nov. 3, 1975  Germany ............................ 2548975

[51] Int. Cl.² .................................................. B60T 8/22
[52] U.S. Cl. .................................... 303/6 C; 303/22 R
[58] Field of Search ............... 303/6 R, 6 C, 7, 22 R, 303/22 A

[56] References Cited

U.S. PATENT DOCUMENTS 3,948,571  4/1976  Hefter et al. ...................... 303/22 R
3,964,794  6/1976  Scholz ................................ 303/6 C

FOREIGN PATENT DOCUMENTS 1,802,370  7/1969  Germany ........................... 303/22 A
2,510,791  10/1975  Germany ............................ 303/6 C

*Primary Examiner*—Trygve M. Blix
*Assistant Examiner*—Edward R. Kazenske
*Attorney, Agent, or Firm*—R. S. Visk; R. W. McIntire, Jr.

[57] ABSTRACT

Fluid pressure operable brake apparatus for controlling the ratio of braking forces exerted on two rear tandem axles of a vehicle, including a driving axle and a trailing axle, in such manner as to provide compatible synchronous braking effort by taking into account dynamic axle load displacement during braking action and including a stepped-piston relay valve responsive to load conditions of the vehicle for adjusting the ratio of braking forces between the driving axle and the trailing axle accordingly.

9 Claims, 2 Drawing Figures

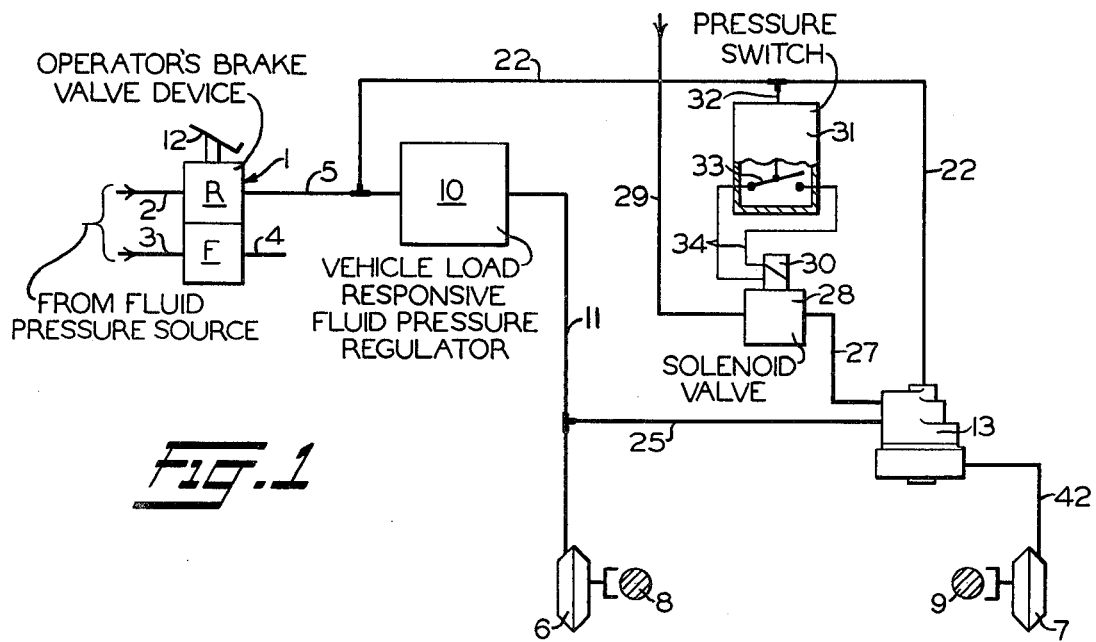

FLUID PRESSURE OPERABLE BRAKE APPARATUS WITH LOAD-COMPENSATING MEANS FOR VEHICLES WITH TANDEM REAR AXLES

BACKGROUND OF THE INVENTION

Vehicle load responsive valve devices are employed for controlling the degree of fluid pressure supplied to vehicle brake cylinders in accordance with the load condition of the vehicle. Such valve devices usually operate responsively to the amount of vehicle spring deflection, either mechanical or air springs, for supplying brake-applying pressure to the brake cylinders at a degree commensurate with vehicle load.

In the case of a motor vehicle having dual rear axles, one of which is a driving axle and the other of which is a trailing axle, certain problems relating to the respective braking forces for each axle are presented due to dynamic axle load displacement.

On a vehicle having a front and a single rear axle, dynamic axle load displacement also occurs during vehicle deceleration or braking. Due to dynamic axle load displacement, normally from the rear axle to the front axle, which is proportional to the rate of vehicle deceleration, a greater braking force is normally applied to the front axle relative to the rear axle. As the vehicle continues to decelerate, however, the degree of axle lod displacement lessens, and, therefore, the degree of braking pressure supplied to the rear axle should be increased, but at a rate commensurate with the rate of deceleration. For this purpose a braking pressure regulating valve device is provided and operates responsively to vehicle rate deceleration for providing a relatively low increase of braking pressure to the rear axle within a range of lower rates of vehicle deceleration and a sharply higher increase of braking pressure to the rear axle during higher rates of vehicle deceleration.

With a vehicle having dual rear axles, however, not only must the factor of dynamic load displacement among the several axles be considered, but the additional matter relating to the load conditions of the vehicle, that is, whether empty or loaded, also becomes a factor to be considered. Variation in stress on the front axle of the vehicle, whether loaded or not, is substantially less than that on the rear dual axle assembly, and, therefore, this invention is primarily concerned with the problems related to the dual axles.

Since the braking apparatus of a vehicle is normally set up to provide adequate braking for a loaded vehicle, such braking force (that is, that for a loaded vehicle) in the case of an empty vehicle and taking into account dynamic axle load displacement, may be excessive for the trailing axle wheels and cause them to lock. As a result, with the trailing axle wheels in a locked state, which in itself is a dangerous condition, the driving axle wheels must assume substantially the entire braking function, thereby resulting in more rapid wear of the brake linings thereon. One solution for this problem is to provide a load responsive brake pressure regulating valve for each axle, which would be an obviously expensive solution.

SUMMARY OF THE INVENTION

The object of the present invention, therefore, is to provide simplified, low-cost brake control apparatus which not only takes into account the degree of dynamic axle load displacement but also the degree of vehicle load, for use particularly on a motor vehicle having, at least, a front axle and rear dual tandem axles comprising a driving axle and a trailing axle.

Briefly the invention, particularly for use on a motor vehicle including a front axle and a rear driving axle arranged in tandem relation with a rear trailing axle, comprises fluid pressure operable brake control apparatus including a conventional load-adjusted portion for supplying braking pressure to the front axle and a novel portion for supplying braking pressure to the rear tandem axles, the driving axle of which is supplied with braking pressure via the operator's brake valve as modified by a load responsive regulating valve. According to the invention, the novel portion includes a stepped-piston relay valve via which braking pressure is supplied to the trailing axle, the stepped-piston of said relay valve having two of three pressure areas subjected, respectively, to the modified pressure supplied to the driving axle and to pressure directly from the operator's brake valve, the combined area of the two pressure areas being predetermined so as to cause supply of braking pressure to the trailing axle commensurate with the amount of dynamic axle load displacement and the load of an "empty" vehicle. When the operator effects supply of braking fluid in excess of a certain pressure reflecting a "loaded vehicle, " a pressure switch opens communicating of the third pressure area of the stepped-piston directly to a pressure source, thereby increasing the degree of braking pressure on the trailing axle according to the combined three pressure areas for accommodating the additional load on the trailing axle.

BRIEF DESCRIPTION OF THE DRAWING

FIG. 1 is a schematic view, mostly in outline, of a braking system embodying the invention.

FIG. 2 is an elevational view, in section, of one component of the system shown in FIG. 1.

DESCRIPTION AND OPERATION

The brake system shown in FIG. 1 for motor vehicles having a front axle and a rear driving axle arranged in tandem with a trailing axle, comprises a pedally operated operator's brake valve device 1 connected via pipes 2 and 3 to a common source of fluid under pressure (not shown). Brake valve device 1 comprises simultaneously operable portions F and R for effecting supply of brake operating pressure via a pipe 4 to front axle brake cylinders (not shown), and via a pipe 5 to brake cylinders 6 and 7 of a driving axle 8 and a trailing axle 9, respectively, only one brake cylinder for each axle being shown. For purposes of understanding the operation of the apparatus herein disclosed and hereinafter described, pipes 2 and 3 may be considered as the source of fluid under pressure.

The end of pipe 5 opposite the end connected to brake valve device 1 is connected to a vehicle load responsive fluid pressure regulator 10. Fluid pressure regulator 10 is of conventional type operably interposed between sprung and unsprung portions (not shown) of the vehicle and adjusted according to the amount of vehicle spring (not shown) deflection for permitting flow of fluid therethrough from pipe 5 to a pipe 11 at a pressure directly proportional to the degree of vehicle load. Pipe 11 connects fluid pressure regulator 10 to the brake cylinders 6 of the driving axle 8. The degree of fluid pressure supplied from pipe 2 to pipe 5 and, therefore, pressure regulator 10 is determined in conventional manner by the extent to which a foot pedal 12 of the operator's brake valve device 1 is depressed by the operator.

According to the invention, the brake system, as shown in FIG. 1, is provided with a relay valve device 13, which is shown in detail in FIG. 2 of the drawing. Relay valve device 13 comprises a casing 14 in which a stepped-piston 15 is operably disposed, said piston having formed thereon, in top to bottom order as viewed in the drawing, an upper annular shoulder or pressure area 16, an intermediate annular shoulder or pressure area 17, and a lower annular shoulder or pressure area 18 of respective progressively increasing dimensions, each of said areas being sealingly isolated from the others by respective sealing rings 19, 20, and 21.

Upper pressure area 16 is subjected to actuating fluid pressure directly from the operator's brake valve device 1 via pipe 5 and a pipe 22 connecting said pipe 5, from a point ahead of regulator valve 10, to a pressure supply inlet 23 formed in casing 14 of relay valve 13 and opening to said pressure area. A modified-pressure passageway 24 formed in casing 14 and opening to lower pressure area 18 is connected via a pipe 25 to pipe 11 for subjecting said lower pressure area to actuating fluid pressure from regulator valve 10 prevailing in pipe 11. Intermediate pressure area 17 opens to an intermediate passageway 26 to which one end of a pipe 27 is connected.

The other end of pipe 27 is connected to a solenoid valve device 28 which is interposed between said pipe 27 and a source of fluid under pressure shown in the form of a pipe 29 constantly charged with fluid at a controlled pressure. Solenoid valve device 28 normally occupies a closed position in which flow of fluid pressure from pipe 29 to pipe 27 and, therefore, to intermediate pressure area of relay valve 13 is cut off. Energization, in a manner to be hereinafter disclosed, of a solenoid 30 associated with valve device 28, effects operation of valve device 28 to an open position in which fluid pressure may flow from pipe 29 to pipe 27, to passageway 26, and to intermediate pressure area 17.

A conventional fluid pressure operable pressure switch 31 is connected by a branch pipe 32 to pipe 22 for controlling operation of a switch member 33 interposed in an electrical circuit 34, which, it may be assumed, includes an energy source not shown and which is connected to solenoid 30 of valve device 28. Pressure switch 31, in usual manner, operates switch member 33 to an open position, when fluid in pipe 22 is at a degree less than a certain predetermined pressure, and to a closed position in response to fluid in said pipe at a degree in excess of said certain predetermined pressure, or what may conveniently be referred to as a change-over pressure, for opening and closing circuit 34, thereby deenergizing and energizing solenoid 30 and effecting operation of valve device 28 to its closed and open positions, respectively.

Normally, pressure in pipe 22 in excess of the aforementioned change-over pressure occurs when the vehicle is loaded, and the operator, in consideration thereof, must make a heavier brake application by effecting sufficient displacement of pedal 12 of brake valve device 1 to supply brake-applying pressure to the system at a degree in excess of said change-over pressure when a full application is desired.

With solenoid valve device 28 in its open position, pressure area 17 of relay valve 13 is subjected to fluid pressure from pipe 29 via said solenoid valve device, pipe 27, and passageway 26. Thus, stepped-piston 15 may be subjected either to cumulative effective pressure acting on pressure areas 16 and 18 (when solenoid valve 28 is in its closed position) or to cumulative effective pressure acting on all three pressure areas 16, 17, and 18 (when said solenoid valve is in its open position).

Relay valve device 13, as shown in FIG. 2, also includes a valve unit 35 comprising a stem 36 having a supply valve 37 coaxially secured at one end thereof and an exhaust valve 38 coaxially secured at the other end. Supply valve 37 cooperates with a supply valve seat 39, and exhaust valve 38 cooperates with an exhaust valve seat 40 for controlling supply of fluid pressure from pipe 22, inlet 23 of relay valve 13, and a delivery outlet 41 formed in said relay valve to a pipe 42 connecting to brake cylinders 7 of trailing axle 9.

Relay valve device 13 has formed therein a supply chamber 43, to which inlet 23 opens, and a delivery chamber 44 open to delivery outlet 41 with supply valve 37 controlling communication between said chambers. Exhaust valve 38 controls communication between delivery chamber 44 and an exhaust passageway 45 opening to atmosphere.

As viewed in FIG. 2, an upper spring 46 is compressedly disposed between the upper side of supply valve seat 39 and an internal shoulder 47 formed in the upper end of stepped-piston 15, and a lower spring 48 is compressedly disposed between the lower side of said supply valve seat and exhaust valve 38.

The operation of the above-described brake apparatus will be considered under two general conditions, that is, with a so-called "empty vehicle" and a so-called "loaded vehicle." For purposes of understanding the operation of the invention, an empty vehicle is a condition wherein the load on the vehicle falls within a low load range varying from no load up to a certain partial load, under which condition the degree of brake-applying pressure needed to be supplied by the operator's brake valve 1 for obtaining maximum effective braking of the empty vehicle is a degree up to but not exceeding the change-over pressure above noted, so that switch device 31 remains unaffected. A loaded vehicle is a condition wherein the vehicle load exceeds the certain partial load and the degree of brake-applying pressure needed for maximum effective braking of the loaded vehicle must be in excess of the change-over pressure.

In effecting a brake application on an empty vehicle, the operator actuates brake valve 1 by depressing pedal 12 to an extent corresponding to the degree of application desired. As above noted, even if a maximum application is desired for the empty vehicle, the degree of operation of brake valve 1 and, therefore, of the braking pressure supplied thereby would normally be less than the change-over pressure, above defined, or within what may be called a low-pressure range.

Braking pressure supply effected by operation of brake valve 1 may flow to brake cylinders 6 via pipe 5 and via pipe 11 after having been adjusted or modified by vehicle load responsive fluid pressure regulator 10, thereby providing the proper predetermined degree of braking pressure to said brake cylinders of driving axle 8 commensurate with vehicle load for effecting a braking action thereon.

The same pressure passing through regulator 10 also flows via pipes 11 and 25 to passageway 24 (see FIG. 2) of relay valve device 13 to act on pressure area 18. Also, pressure from brake valve device 1 flows via pipes 5 and 22 directly to supply inlet 23 and supply chamber 43 of relay valve device 13 to thereby act on pressure area 16.

The combined effect of pressure acting on areas 16 and 18 causes downward movement, as viewed in FIG. 2, of piston 15 to a supply position in which exhaust valve 38 is seated on exhaust valve seat 40 while leaving supply valve 37 unseated relative to supply valve seat 39. Thus, braking pressure from pipe 22 may flow via inlet 23, supply chamber 43, delivery chamber 44, outlet 41 and pipe 42 to brake cylinders 7 of trailing axle 9 for effecting a braking action thereon of a sufficiency commensurate with an empty vehicle. Spring 48 acts to firmly maintain exhaust valve 38 seated on valve seat 40.

When pressure in delivery chamber 44 and effective on the lower side of piston 15, equals the opposing combined effective pressure acting on pressure areas 16 and 18, said piston moves upwardly until supply valve 37 seats on supply valve seat 39, whereby valve unit 35 assumes a lapped position in which both said supply valve and exhaust valve 38 are seated on the respective valve seats 39 and 40. When supply valve 37 is seated on supply valve seat 39, spring 46 acts to also firmly press the lower surface of said supply valve seat against an annular internal shoulder 49 formed in piston 15 opposite shoulder 47, thereby preventing leakage of pressure around the external limits of the valve seat.

The dimensions of pressure areas 16 and 18 of piston 15 are calculated such as to provide, when subjected to braking pressure within the low-pressure range, a braking force ratio wherein the braking force acting on the trailing axle 9 is less than that acting on driving axle 8 when the so-called empty vehicle or low load condition, above defined, prevails.

Valve unit 35 and piston 15 function in conventional self-lapping manner for maintaining braking pressure supply to trailing axle 9 at the selected degree established by the operator.

When a loaded vehicle condition prevails, the braking force ratio between driving axle 8 and trailing axle 9 should be altered accordingly to compensate for the heavier load on the axles as well as the greater dynamic axle load displacement to provide substantially equal braking forces to the driving axle 8 and trailing axle 9. Accordingly, pressure switch device 31 and solenoid valve device 28 are provided in the system.

Because of the loaded vehicle condition, the operator causes brake valve device 1 to supply a higher degree of braking pressure (if maximum effective braking action is desired) than that supplied under the empty vehicle condition. This higher braking pressure, after being modified by the vehicle load responsive regulator 10, is supplied via pipe 11 to brake cylinders 6 of driving axle 8, as before.

The higher braking pressure supplied for effecting maximum effective braking when a loaded vehicle condition prevails, as above explained, is normally greater than the change-over pressure above defined. Thus, pressure switch 31 is actuated to cause switch member 33 to close circuit 34 and thereby enregize solenoid 30 which, in turn, operates valve device 28 to its open position, above defined. Fluid at a controlled pressure from pipe 29 may thus flow via pipe 27 and passageway 26 to pressure area 17 of piston 15 of relay valve 13. Thus, braking pressure supplied to brake cylinders 7 of trailing axle 9 is correspondingly increased to a pressure determined by the total area of pressure areas 16, 17, and 18.

The dimension of pressure area 17 is calculated such that, when combined with pressure areas 16 and 18, the resulting increased braking pressure supplied to trailing axle 9 provides the desired braking ratio between driving axle 7 and said trailing axle for providing desired efficient braking action that compensates for the heavier load and the greater amount of dynamic axle load displacement, or a more equal distribution of braking stresses between said two axles.

Having now described the invention, what we claim as new and desire to secure by Letters Patent, is:

1. Fluid pressure operable brake apparatus for vehicles having tandem rear axles including a driving axle and a trailing axle and respective brake cylinders therefor, said brake apparatus comprising:
    a. a first source of fluid under pressure;
    b. first means for effecting supply of a first braking pressure from said first source to the driving axle brake cylinders at a selected degree;
    c. second means interposed between said first means and said driving axle brake cylinders for modifying said first braking pressure supplied to said driving axle brake cylinders according to vehicle load;
    d. a relay valve means being formed therein with a first pressure area, a second pressure area, and a third pressure area, each sealingly isolated form the others, said relay valve means connected in parallel relation to said first means and to said second means and actuable for effecting supply of a second braking pressure therefrom to the trailing axle brake cylinders at a degree of pressure determined by the combined effect of a first actuating pressure from said first means acting on said first pressure area and a second actuating pressure from said second means acting on said third pressure area;
    e. a second source of fluid at a controlled pressure; and
    f. third means connected in parallel relation to said first means, to said relay valve means, and to said second source, and including a valve device normally occupying a closed position in which communication between said second source and said relay valve means is cut off,
    g. said third means being operable responsively to said first actuating pressure at a degree greater than a change-over pressure for effecting operation of said valve device to an open position in which fluid from said second source is communicated to said relay valve means for effecting supply of braking pressure to said trailing axle brake cylinders at a degree determfined by the combined effect of said first actuating pressure from said first means acting on said first pressure area, said second actuating pressure from said second means acting on said third pressure area, and said controlled pressure acting on said second pressure area.

2. Fluid pressure operable brake apparatus, as set forth in claim 1, wherein said second means comprises a vehicle load responsive fluid pressure regulator for effecting supply of said first braking pressure at a degree proportional to the degree of vehicle load.

3. Fluid pressure operable brake apparatus, as set forth in claim 1, wherein said third means comprises:
    a. a fluid pressure operable electrical switch device connected to said first means and including a switch member interposed in an electrical circuit, said switch member normally occupying an open position in which said circuit is open, said switch device being operable responsively to said first actuating pressure at said degree greater than said change-over pressure for operating said switch member to a closed position in which said circuit is closed; and wherein b. said valve device is provided with a solenoid interposed in said circuit for effecting operation of the valve device to its said closed and open positions upon opening and closing of the circuit, respectively.

4. Fluid pressure operable brake apparatus, as set forth in claim 1, wherein said relay valve means further comprises a stepped-piston having said first, second, and third pressure areas formed thereon.

5. Fluid pressure operable brake apparatus, as set forth in claim 4, wherein said relay valve means further comprises a valve unit including a supply valve and an exhaust valve of the self-lapping type for controlling said supply of said second braking pressure to said trailing axle brake cylinders and maintaining the degree of pressure thereof at the established level.

6. Fluid pressure operable brake apparatus, as set forth in claim 4, wherein said stepped-piston is characterized by a plurality of coaxial annular shoulders of progressively increasing dimensions formed thereon for providing said first, second, and third pressure areas, respectively.

7. Fluid pressure operable brake apparatus, as set forth in claim 6, wherein said first pressure area is the smallest and said third pressure area is the largest.

8. Fluid pressure operable brake apparatus, as set forth in claim 7, wherein the dimensions of said first and third pressure areas are predetermined so as to provide, when subjected to said first and second actuating pressures, respectively, a combined effective pressure area for effecting said supply of second braking pressure to the trailing axle at a degree of pressure which produces a braking force thereon less than the braking force effected on the driving axle by said first braking pressure.

9. Fluid pressure operable braking apparatus, as set forth in claim 8, wherein the dimension of said second pressure area, relative to said first and third pressure areas, is pedetermined so that when said first, third, and second pressure areas are subjected to said first and second actuating pressures and to said controlled pressure, respectively, the braking pressure supplied to and the resulting braking force acting on said trailing axle is substantially equivalent to that acting on the driving axle.

* * * * *

UNITED STATES PATENT AND TRADEMARK OFFICE
CERTIFICATE OF CORRECTION

PATENT NO. : 4,040,673
DATED : August 9, 1977
INVENTOR(S) : Gerhard Ahaus, Siegfried Netzer & Hans-Peter Liebig It is certified that error appears in the above-identified patent and that said Letters Patent are hereby corrected as shown below:

Column 6, line 57, after "degree" insert --directly--

Signed and Sealed this

Twenty-fifth Day of April 1978

[SEAL]

Attest:

RUTH C. MASON
Attesting Officer

LUTRELLE F. PARKER
Acting Commissioner of Patents and Trademarks